United States Patent Office 3,767,746
Patented Oct. 23, 1973

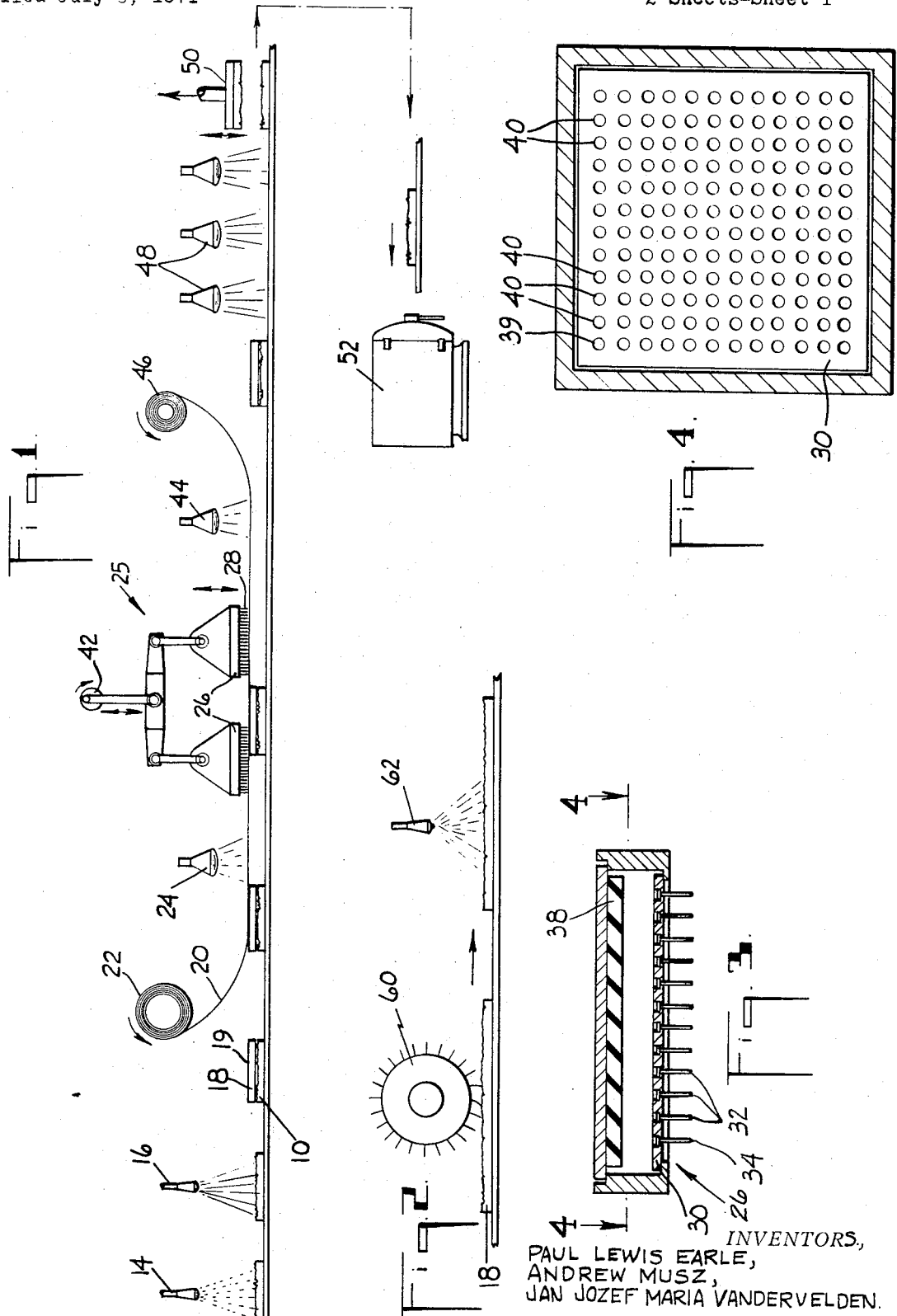

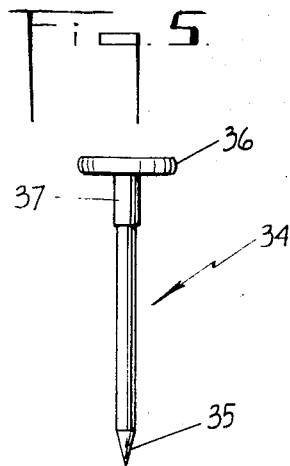
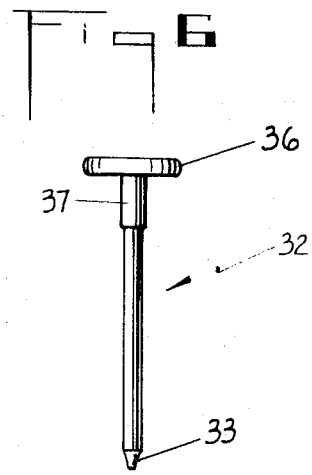
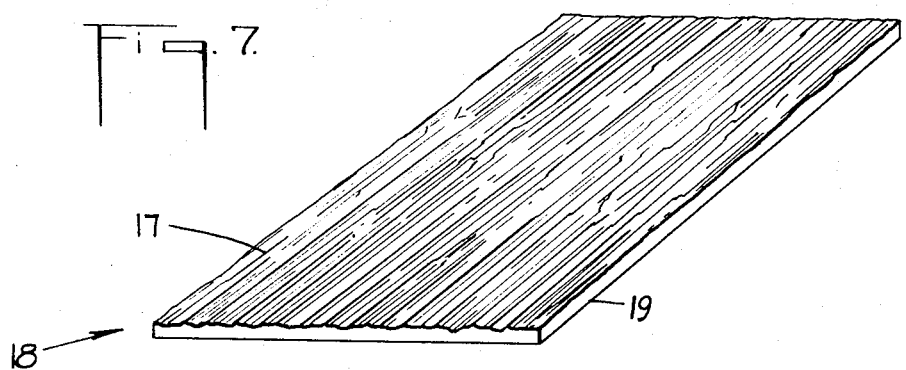

3,767,746
METHOD OF FORMING A TEXTURED SURFACE ON A DEFORMABLE SHEET
Paul Lewis Earle, Martinsville, and Andrew Musz, Raritan, N.J., and Jan Jozef Maria Vandervelden, Mol, Belgium, assignors to Johns-Manville Corporation, New York, N.Y.
Filed July 8, 1971, Ser. No. 160,857
Int. Cl. B28b 1/10
U.S. Cl. 264—69                                    30 Claims

ABSTRACT OF THE DISCLOSURE

An improved process and apparatus for vibration impact texturing of asbestos cement products and an apparatus therefor. Prior to placing a deformable material on a mold carrying a negative impression of a pattern desired to be imparted to the deformable material, the mold is coated with a liquid which is capable of being absorbed by the deformable material to displace air from recessed areas of the mold. The deformable material while on the mold is subject to the action of rapidly moving members to transfer the pattern to the material. At least some of the rapidly moving members which first impact against the deformable material have sharp pointed ends and the remaining members have blunt ends. After impact by the reciprocating members, the material on the mold is heated to preset the deformable material. The presently preferred deformable material is asbestos-cement in sheet form.

BACKGROUND OF THE INVENTION

Field of the invention

This invention relates to an improved texturing process and apparatus and more particularly to an improved vibration impact texturing process and apparatus for articles in a deformable state.

DESCRIPTION OF THE PRIOR ART

In the past, numerous techniques have been proposed and developed for imparting decorative effects to panels and similar articles in the building products and related industries. In particular, products of hydraulic setting calcareous cement and fiber compositions, such as asbestos-cement sheets, have been provided with surface patterns by means of embossing or impressing designs on the surface of such products. For example, U.S. Pat. No. 3,437,548, issued Apr. 9, 1969 to Ayers, relates to a method of providing designs in hydraulic setting calcareous binder and fiber bodies by impressing selected portions of the surface of the body with desired designs, curing the binder phase and sanding to remove protuberances extending beyond the depressed surface to provide a smooth plane surface. The designs produced result from differences in intensity of the base color due to variations in density. Attempts were also made to use embossing rolls or plates to provide surface texturing. The decorative products intermediately produced by the process described by Ayers and those produced by the embossing process were generally of a rounded and shallow texture, that is, the distance between crowns and valley in the surface texture were slight, usually not more than ⅛ inch. Such products failed to exhibit desirable sharp and deep decorative patterns. Especially with processes utilizing embossing techniques, when attempts were made to impart deeper surface configurations and textures, stresses necessarily resulting from the increased pressure requirements produced cracks and similar deformities in the cured products.

Asbestos-cement sheets have also been corrugated in the uncured state by means of corrugating rolls or a corrugated die, for example. It will be appreciated that such products do not have surface textures exhibiting sharp and deep decorative patterns or patterns of an intricate nature. Rather the corrugated patterns have been of a simple and functional nature and limited in degree of curvature due to the tendency for highly curved corrugations to crack.

Surface crimps have also been imparted to such bodies while in the uncured or green state for purposes of allowing subsequent formation of sharp bends and irregular shapes. Such a process is disclosed, for example, in U.S. Pat. No. 3,197,536, issued July 27, 1965 to French. These crimps, of necessity, are functional in nature, limited in "design" and are not decorative surface configurations.

A process was developed to produce hydraulic setting calcareous binder and fiber composition products having deep textured surface patterns by utilizing a vibration impact technique to conform such products to a desired surface pattern carried on a mold. The process comprises vibration impact texturing of green or uncured asbestos-cement sheets by employing reciprocating nails to impact against the rear face of the sheet so as to knead or form the front face of the sheet against a design-bearing mold to thereby transfer the design to the front face. The nails are supported in a box arrangement (referred to as the "nail box") which forms part of the texturing machine (the "nail machine"). The nails, arranged in rows and extending through openings in the nail box, have blunted ends in order to prevent damage to the sheet. The nail box is connected to a reciprocating means which is capable of imparting a high frequency vibration, that is, a rapid moving reciprocating action, to the nails. The nails extend across the width of the sheet and the nail machine may move across the length of the sheet to impact the entire surface area of the rear face corresponding to the front face desired to be textured. The sheet is deposited on a mold bearing the negative impression of the desired configuration and the rear face is covered with a saturated burlap fabric. The sheet is then textured by the nail machine, the fabric is removed and the sheet is partially cured on the mold and then cured by air and/or steam in the conventional manner for curing asbestos-cement products.

Such a process has had several disadvantages which have limited its commercialization due to low quality products, processing difficulties and slow production rates. The resultant products were found to have imperfect texture reproductions, such as distorted or cracked portions of crests, rounded rather than sharp textures, incompletely formed textures and surface cracking. During the vibration impacting, the products had the tendency to buckle or curve up thereby producing blisters and hence surface distorted products especially with molds carrying intricate patterns. This buckling or raising up of the sheet away from the mold at times resulted in ridges or humps reaching a height of about four to six inches. The process further required an excessive mold retention time before stripping the molded article from the mold, which had the adverse effect of slowing down recycling and reuse of the molds. It was required to retain the sheets on molds for periods of 12 to 24 hours before the sheets had sufficient integrity to enable them to be stripped from the molds. It is apparent that improvements are necessary in order to produce commercially acceptable products by a vibration impact texturing process at economically feasible production rates.

OBJECTS OF THE INVENTION

It is an object of the invention to provide an improved process for texturing articles.

It is a further object of the invention to provide an improved vibration impact process for texturing articles while in a deformable state.

A further object of the invention is to provide an improved high frequency vibration impact process for texturing articles comprising hydraulic setting binder and fiber, such as asbestos-cement products.

A still further object of the invention is to provide an improved vibration impact process for texturing asbestos-cement sheets while in an uncured stage.

An additional object of the invention is to provide an improved vibration impact texturing process operable at acceptable production rates and capable of forming products having deep, sharp and intricate textures.

Another object of the invention is to provide an apparatus for vibration impact texturing articles while in a deformable state.

Other objects and advantages of the invention may be set forth in part in or be apparent from the description which follows or from the drawings.

BRIEF DESCRIPTION OF THE DRAWINGS

FIG. 1 is a schematic representation of the process and apparatus of this invention.

FIG. 2 is a schematic representation of a preferred finishing operation of this invention.

FIG. 3 is a cross-sectional view of a nail box useful in carrying out this invention.

FIG. 4 is a plan view of the nail box taken along line 4—4 of FIG. 3.

FIG. 5 is a view of a sharp pointed nail which may be employed in this invention.

FIG. 6 is a view of a blunted end nail which may be employed in this invention.

FIG. 7 is a perspective view of a textured sheet made in accordance with this invention.

SUMMARY OF THE INVENTION

This invention provides an improved vibration impact texturing process for materials in a deformable state and apparatus for carrying out the process. The process and apparatus are capable of producing products exhibiting good pattern definition and true texture reproduction even with designs having intricate patterns with deep textures and sharp points, as well as with less intricate designs and designs which have soft or rolling patterns. Textured products of, for example, hydraulic setting calcareous cement and fiber compositions, such as asbestos-cement, can be produced.

It has been found that one of the major reasons for poor pattern definition and buckling up of the material during vibration impact texturing was the presence of air at the interface between the mold and the material to be textured, especially within the recessed areas, such as valleys and depressions, of the mold. Air became trapped at the interface after the material was placed on the mold. It was discovered that this air can effectively be displaced by applying to the mold a liquid, such as water, which is capable of being absorbed by the material to be textured and does not interfere with the setting of the cementitious or binder component. The liquid is applied to the mold prior to placing the material to be textured on the mold. It was further found that air pockets remaining at the interface could be eliminated by providing at least some, and preferably all, of the rapidly moving reciprocating members or elements which initially impact the material on the mold with sharpened points. Vibration impact with sharpened points deflates the air pockets and provides escape passages for the air which passages are thereafter closed or hidden by the following impacting reciprocating members which are provided with blunted ends. In accordance therewith, nails in at least the leading edge or row of the first nail box to contact the material may be provided with sharp points. As a result of the above improvements, deep, sharp pattern definition has been achieved by the vibration impact texturing process. Patterns having depths of about ⅜ inch and including sharp crests and valleys have been authentically reproduced.

It was additionally found that the textured material could be stripped from its mold within a shorter period of time while still obtaining true pattern reproduction by presetting the material subsequent to the vibration impact texturing stage. This preset comprises heating the material on the mold for a relatively short period of time. Mold down-time, that is, the period during which the textured material remains on the mold and is thus not available for recycling and reuse, has been reduced to an economically feasible level resulting in lower capital expenditures for molds and thus attractive commercial production rates.

An important corollary result of applying an absorbable liquid such as water on the mold is that the density of the final product can to an extent be controlled by controlling the amount of such liquid absorbed by the texturable composition during vibration impact texturing. That is, within the limits of the amount of liquid required to produce good pattern definition and an acceptable textured product, a variety of final product densities can be achieved by regulation of the amount of liquid absorbed. A lower density will result by allowing the material to absorb a greater amount of liquid and, conversely, higher densities can be obtained by absorption of a lesser amount of liquid.

The process and apparatus of this invention are particularly applicable for texturing hydraulic setting calcareous cement and fiber composition articles, such as asbestos-cement. However, other compositions or materials which are in a deformable, impressionable, plastic, pliable uncured or "green" state can be similarly textured. For example, a wood fiber and cement composition, or a fiber and cement composition comprising natural or synthetic organic or inorganic fibers, or mixtures thereof, can be used. Millboards, such as asbestos millboards, containing, for example, starch or silica binders and compositions of wood pulp and latex binder can also be textured. Also, papers and felts of desired thickness could be similarly imparted with a chosen surface configuration.

As mentioned, the process and apparatus of this invention can be used to impart surface texturing to a deformable material. The term "deformable" material is intended to refer to a material which is deformable during the vibration impact texturing and thus is capable of being molded or conformed to a desired texture.

While the invention also is particularly suitable for texturing deformable materials in sheet or slab form with relatively flat surfaces, materials in a variety of shapes could be likewise textured. For example, articles or bases with arcuate, rounded, corrugated, bent and other non-linear shapes could be textured by adjusting the configuration of the nail box accordingly and the location of the rapidly moving members or elements therein, as well as, of course, using a texturing mold of a shape corresponding to that of the article or base.

It should be understood that while in the discussion which follows, reference may be primarily made to asbestos-cement articles and particularly asbestos-cement sheets, other compositions and shapes as stated above or in the following disclosure may be employed in the process and apparatus of this invention.

The term "vibration impact" as used herein is used in the broad sense to refer to a rapid repetitive movement, such as by reciprocation, of a member, by a driving force, against an article desired to be textured, by direct contact with such article or by transmission of the force to the article through a covering member. The driving force causes the member to impact, strike, push, impress or impinge against the texturable article directly or indirectly to press down, force, tamp, wedge in or knead the article against a patterned mold to transfer the pattern to the surface of the article contacting the mold.

DESCRIPTION OF THE PREFERRED EMBODIMENT

Asbestos-cement sheets or panels in the green state formed or produced by any conventional procedure or technique including a wet forming process or a dry forming process are the starting materials for the practice of this invention. In the wet forming process, the raw ingredients are initially mixed with a large volume of water forming thereby a slurry. The solids in the slurry are deposited on a conveyor belt or felt to to form a thin web and the saturated solids are thereafter subjected, for example, to the action of a plurality of vacuum boxes and a weighted accumulator roll which rolls the furnish into its approximate final sheet thickness. In the dry process, the raw ingredients are mixed together while in a relatively dry state. Water is added to the mixture after being laid upon a conveyor belt or felt as a furnish and the wet furnish is, for example, subjected to the action of picker rolls, perforated press rolls and plain press rolls. If desired, a veneer may be applied to the sheet. The asbestos-cement article or base can also be formed by casting or molding any desired shape from a wet admixture of the applicable solids. The wet mixture could be poured or otherwise inserted into and on the mold in conjunction with any necessary means of dewatering. In addition, the articles can be formed on a board machine, a paper machine, a hydraulic forming press or by a vacuum forming technique or other conventional procedures.

The hydraulic setting calcareous binder and fiber bodies or compositions which may be textured according to the process of this invention preferably comprise Portland cement and asbestos fiber. Silica may be present if the bodies or compositions are to be steam cured, which is preferred. A variety of fillers may be included, such as pigments or coloring agents and scrap resulting from sheets of asbestos-cement which are crushed and ground. Scrap may be present, for example, between about 1 to about 20 percent by weight. The bodies or compositions may comprise other materials as set forth above.

By way of illustration, asbestos-cement sheets may be formed from the following composition; all percentages being by weight:

|  | Percent |
| --- | --- |
| Asbestos fiber | 28 |
| Portland cement | 41 |
| Silica flour | 25 |
| Scrap | 6 |

With reference to the drawings, wherein like numerals refer to like or corresponding parts, the process of this invention is shown in FIG. 1 in which green or uncured asbestos-cement sheets 18 are provided with a decorative surface texture. These green sheets may be produced from a dilute aqueous slurry comprising solids on a wet forming machine under standard conditions. The slurry may consist of hydraulic setting cement, such as Portland cement, asbestos fiber and silica. The green sheets are produced by building up laminations of thin webs of stock and consolidating the same on the forming and consolidating mandrel or accumulator roll of the wet machine to a desired thickness, such as for example about 0.3 inches. The sheets still contain considerable amount of water, for example, between about 20 to 30 percent by weight of the solids with the ingredients being intertwined in a wet state. The green or uncured sheets are of a consistency sufficiently plastic so as to be deformable and conform to mold surfaces during vibration impact and yet at the same time are capable of being handled in sheet form without appreciable difficulty. The sheets are transferred to a mold station to be placed on a patterned mold.

A mold 10 carrying a negative impression, in the form of recessed and elevated areas, of the surface texturing pattern desired to be transferred to the sheets is provided; the pattern design may of course be varied. For example, the molds may be provided with intricate patterns defined by interconnected and intersecting continuous recessed areas and patterns defined by spaced discontinuous recess areas. With such patterns, there is a considerable tendency for air pockets to form during vibration impact texturing of sheets which are in contact with molds carrying such patterns. As previously mentioned, with the previously used vibration impact process such air pockets tended to produce buckling of the sheets and hence surface distorted products due to the fact that with such mold designs, any air escape passages inherently present in the particular mold design were either tortuous in direction and thus impeded with air escapage or were non-existent. By practicing the improved process of this invention, such intricate patterns can be reproduced on deformable materials with good pattern definition. Sharp and deep patterns can also be imparted to the deformable material, as well as less pronounced, more rounded patterns. The mold can be made of conventional mold materials such as epoxy, asbestos-cement, plastic, gypsum, wax, etc. Molds of epoxy resin are presently preferred.

The molds are prepared for the molding operation in a particular manner which facilitates stripping of the sheet from the mold and which improves the pattern definition in the final product. The mold is placed on a conveyor belt or other support and is initially coated with a release agent by means, for example, of spray nozzle or nozzles 14. Alternatively, the surface of the sheet 18 to be placed against mold 10 could be coated with the release agent. The release agent aids in stripping the sheet from the mold following texturing and should be immiscible with the liquid to be applied to the mold. The release agent may be an oil and is preferably a mixture of raw linseed oil and kerosene (for example, a 1:36 mixture). Care should be taken to apply only a light coating of the release agent because a heavy coating would result in poor texture definition in the final product since the asbestos-cement sheet would be prevented from conforming to the recessed areas of the mold because the asbestos-cement sheet does not absorb the release agent. It is preferred to limit the coating to a maximum of about 10 grams per square foot of mold surface area and more preferably to about 5 grams per square foot. A liquid which is capable of being absorbed by the asbestos-cement sheet and which does not interfere with the setting of the cementitious or binder component or phase is then applied to the mold. Spray nozzle or nozzles 16 can be used for this operation and are presently preferred. The liquid is deposited on the mold to a depth sufficient to displace air in the recessed areas, such as valleys and depressions, of the mold; filling about ⅔ the depth of the recessed areas with the liquid has produced satisfactory results. Water is the presently preferred liquid and is readily absorbed by the asbestos-cement sheet.

As previously stated, by controlling the amount of absorbable liquid applied to the mold, the density of the final product may be varied. The larger the amount of liquid absorbed by the sheet, the lower is the final density; the lower the amount of liquid absorbed, the higher the final density. Enough liquid must, however be applied to the mold to fill the recessed areas thereof to an extent so as to displace air therefrom and reduce the incidence of air pocket formation at the sheet-mold interface in order to produce good texture reproduction. This minimum application of liquid depends of course on the particular pattern carried by the mold and may vary for different patterns or designs. It is the amount of liquid application above this minimum or threshold level which may be altered to produce the final products of different densities.

Subsequent to the initial mold preparation, the sheet 18 is placed face down on mold 10. The liquid at the mold-sheet interface reduces the tendency of air pockets to form at the interface which would induce buckling of the sheet during texturing. The rear face 19 of sheet 18 is preferably covered with a covering sheet 20, such as a relatively strong and wear-resistant wet or damp fabric, which serves to restrict local sheet movement and prevent accumulation of solids on the nails or rapidly moving members, as is presently practiced. The cover sheet is wetted with a liquid, preferably water. A burlap fabric having a moisture content of about 250 percent has been found effective for these purposes. Other fabrics may be used. The burlap may be immersed in a water tank and then allowed to drain for a period of time to the desired moisture content. The burlap fabric may be stored on a roll 22 prior to placement over the sheet. The sheet and mold covered with the burlap are then transported by appropriate means towards the nail machine 25. They may be preheated before entering the nail machine by means, for example, of infrared lamp or lamps 24 located on the inlet side of the machine. These lamps increase the rate of water evaporation and absorption during vibration impact texturing and reduce the time required for preset prior to the stripping from the mold. Other heating means can be used, such as conventional hot air ovens. The sheet and mold covered with burlap are advanced through the nail machine at a desired rate such as, for example, about 2 to 6 feet per minute. The speed of advancement depends on a variety of factors, including the mold pattern, the sheet composition and amount of water present therein, the frequency of vibration (e.g. reciprocations per minute), the number of nails, etc. The sheet and mold could alternatively remain stationary and the nail machine moved thereover. Nail machine 25 is basically similar to that previously described but has been primarily altered by providing at least the leading row or edge of the nail box. which initially impacts the sheet, with sharpened nails in order to deflate any air pockets remaining at the sheet-mold interface.

The nail machine 25 comprises at least one and preferably a plurality of nail boxes 26 which support the rapidly moving members or impacting elements 28. Although metal nails are preferred as the rapidly moving members, other relatively stiff materials could be employed. These include rods and other cylindrical or non-cylindrical shaped members or elements of plastic, hard rubber, metal or similar materials. The nails 28 are preferably loosely attached to a support in order to allow some movement of the nails in the plane of the asbestos-cement sheet when the nails contact the moving sheet. This prevents tearing of the sheet which would likely to occur if the nails were rigidly fixed to the support and thus incapable of such movement. A perforated plate can be used for this purpose with the head or upper portion 36 of the rapidly moving members being supported by the plate. Other means of supporting the nails could also be used such as fastening the nails to a plate in the nail box with a length of chain. A nail box 26 preferably includes a perforated plate 30 having a plurality of openings of apt diameter, such as ¼ inch, preferably located in rows 39, 40 and spaced, for example, ½ inch off center. The rows 39, 40 extend across the width of the nail box in a direction which is transverse to the direction of relative longitudinal movement of the mold and sheet with respect to the position of nail machine 25. The nails in rows 39, 40 of plate 30 may be staggered with respect to an adjacent row along the length of the rows. In addition, it should be understood that the rows 39, 40 do not have to extend in a direction to intersect such relative longitudinal direction at right angles as they can intersect such relative longitudinal direction at any desired angle. Moreover, arranging the nails in rows is merely preferred; other arrangements of the nails may be used. Rubber or plastic washers 37 may surround the shaft portion of the nails near their head portions 36 (FIGS. 5 and 6) and the nails 32, 34 extend into the openings and are supported by such washers if present or by their head portions 36 if washers are not employed. Washers 37 serve to reduce noise during operation of the nail machine. The nails are loosely attached to plate 30 to allow movement of the nails as discussed above. A rubber mat 38 or similar resilient material may be provided on the inside of the top of the nail box to reduce noise levels caused by the reciprocating nails striking the top of the nail box. Each nail box 26 may be, for example, one foot long and extend across the entire width of the sheet. Metal nails similar to standard 50 penny nails of 5 to 6 inch length but without ridges or lines around the circumference adjacent the head portion are preferred. Nails 32 are provided with blunted ends 33 opposite their head portions to serve as the impacting surfaces. In each nail box 26, the nails which initially impact against the asbestos-cement sheet, nails 34, have sharp pointed ends 35.

The rapidly moving members (e.g., nails) are arranged such that at least some of the members which initially impact against a general portion of the sheet have sharp pointed ends. The term "initially impact against a general portion of the sheet" is used in the sense that for any given general area of the rear surface of the sheet, at least some of the rapidly moving members which first strike against the sheet in that area have sharp points. It should be understood that within the general portion of the rear face of the sheet certain areas may not be contacted by the sharp pointed nails or by any nails at all; but within the general area, at least some of the first (from a standpoint of time) nails which strike against the sheet have sharp ends. For example, considering a generally rectangular plate in the nail box, such as shown in FIGS. 3 and 4, by providing the nails in rows transverse to the direction of the sheet movement and if all of the nails in the leading row 39 had sharp pointed ends (which is preferred), there would be certain areas along a transverse line on the rear face of the sheet corresponding to the transverse row of nails which are not initially impacted by the sharpened nails, viz., those areas corresponding to the spaces between the nails in the first row. However, areas adjacent those certain non-impacted areas would be initially impacted by sharp nails and thus the general portion of the rear face of the sheet would include both impacted and non-impacted areas; but within that general portion at least some of the nails which first strike the sheet would be sharp pointed nails. The general area could also include, in this case, areas forward or rearward of the transverse line to include areas which are first contacted by blunt nails or which are not contacted by the nails. As another example, if the first row 39 of the nail box shown in FIGS. 3 and 4 had alternating sharp and blunt nails, the general portion of the rear surface in this instance would usually be larger than the general portion in the example where all the nails in the first row had sharp points, so that although more than one nail may impact against the sheet in that general portion, at least one of those nails would have a sharp point.

A nail machine with two nail boxes has been found to be effective. A larger number of nail boxes can be used although counterbalancing may be necessary in order to avoid bunching up of the sheets. At least some, and preferably in most cases all, of the nails in the leading row 39 of the first nail box have sharp pointed ends in order to puncture any air bubbles formed in the rear face 19 of sheet 18 to release air trapped in the blisters, thus making capable the formation of the desired sharp texture. These air bubbles are manifest as portions of the material raised off of the mold. The sharp pointed ends 35 of nails 34 extend through covering sheet 20 to puncture such bubbles or raised portions on the rear face. Apertures which may be formed by the sharp nails are filled in by following blunt nails. Sharp nails may additionally be provided in other rows of the nail box but it is preferred that most of the nails which impact the sheet have blunt ends. Enough blunt nails should be provided to produce a sharp pattern definition and to cover up apertures made by preceding sharp nails. It is desirable to provide the leading row of any second or subsequent nail box with sharpened nails in order to puncture any air pockets that may have been formed by the lifting effect of the first nail box. The nail boxes 26 are connected to a reciprocating means 42 which can be, for example, actuated by eccentric bearings, crankshafts or cams, and which is capable of imparting a high frequency or rapid reciprocating motion to the nail boxes. Reciprocation may be, for example, at a frequency of between 4 and 6 cycles per second; a frequency of 250 per minute has been found to be effective and desirable. It is possible to operate at higher frequencies with different sources of reciprocation. Reciprocation of the nail boxes is adjusted to a desired stroke, for example, a three inch stroke such that the nails or other reciprocating elements travel a distance of about three inches. Sheet 18 on mold 10 is conveyed through the nail machine at a desired rate of speed. The reciprocating nails impact against the rear face 19 of sheet 18 resulting in conforming the front face 17 of the sheet to the mold pattern, thereby transferring a surface pattern to the asbestos-cement sheet. Subsequent to traveling through the nail machine, the sheet and mold together with the burlap covering are passed through a heated area, such as under infrared lamp or lamps 44, if desired, in order to raise the temperature of sheet 18 to further facilitate stripping. The burlap or other covering 20 is then stripped off the rear face 19 of sheet 18 and may be rolled up on roll 46. The sheet is thereafter post-heated while on the mold to obtain an initial set and to evaporate any remaining water at the interface. This preset heating stage can include any conventional heating means, such as infrared lamp or lamps 48 or a hot air oven (not shown). The sheet is heated, for example, to a temperature between about 120° F. and about 140° F., as measured at the rear face of the sheet. The temperature may be higher or lower as desired. Heat lamps are preferred and the sheet is post-heated for a short period of time, such as 20 minutes, which is considerably less than the time the sheets were heretofore required to remain on the molds before air cure. This permits a much more rapid separation of the mold and the sheet after the texturing operation and allows for a shorter recycling period for the molds.

Following the post-heat treatment, the sheet is removed from the mold. This can be accomplished by means, for example, of a vacuum transferring device 50 well-known in the industry. Because most of the water or other liquid initially present at the interface has been previously absorbed or evaporated, suction forces at the interface are minimized so that the vacuum stripping operation is not impeded with. The sheets are thereafter stacked and air cured in the conventional manner. As a precaution to prevent injury to the textured surface, spacing sheets, for instance, plastic foam and/or asbestos-cement sheets, can be interleaved between the textured sheets during the curing operation. The sheets may be air cured for a period of time, such as 48 hours. A steam cure in an autoclave 52 may follow the air cure, as is customary with asbestos-cement sheets. As an example, the sheets may be steam cured for about 20 hours at about 100 p.s.i.

Following formation and curing of the asbestos-cement sheets, it has been found desirable to smooth out any imperfections and remove any loose particles in the surface texture by contacting the sheets with a rotating brush 60 or similar device. Brushes having abrasive bristles formed by extruding a plastic mix containing abrasive particles have been found to be effective in removing surface blemishes and dust resulting from a cutting operation if the sheets are trimmed to a desired size. The sheets are then ready for a conventional finishing treatment. For example, paint, such as acrylic paint, may be applied to the sheets to impart a finish and color thereto by means of spray or sprays 62. As previously mentioned, pigments could be included in the forming composition resulting in an integral color in the textured sheet or panel. Also, thin pigmented veneers could be applied to the panels.

From a commercial production standpoint, it is important to clean the molds after their use and prior to reuse in order to retain their capability of forming sharp, clear reproduction. The molds may be cleaned in any conventional manner. As an example, the molds are cleaned with a rotating brush and high water pressure, the water thereafter being removed with air knives.

It may be desired to include a coating of a wetting agent during the mold pretreatment process to facilitate the water or other liquid in completely filling and coating the mold depressions to the desired depth. The wetting agent could be applied in numerous ways, such as by a separate spray prior to the water spray or by inclusion in the water spray.

Chemical accelerators which preset the binder phase of the composition may be desirably included in ord to remove water at the mold-sheet interface and aid in the stripping process. These compositions may be used as alternatives to the post-heating means or in conjunction therewith. Triethanolamine is one chemical accelerator that may be used and a solution of the same can be applied to the wet machine asbestos-cement laminate prior to its transfer to the accumulator roll. This compound reacts with Portland cement to produce a rapid set of the binder. Solutions of triethanolamine in water may be used to coat the sheets to a desired amount with concentrations ranging from about 1 to about 4% by weight, for example.

Sheets or panels produced by the herein disclosed process and apparatus may be used for many purposes. Asbestos cement textured sheets or panels can be used primarily in exterior wall construction for fascias, spandrel panels and general wall panels and for interior uses, such as interior walls and decorative surfaces.

Vibration impact texturing has been found to result in high quality, deep textured asbestos-cement sheets and other articles. Particularly with asbestos-cement sheets the vibration impact texturing process is desirable as it is found to heal any cracks formed in the product resulting from stretching of the material during texturing. As mentioned previously, sharp, deep and intricate texture patterns can be imparted to deformable materials by the practice of this invention. Patterns having depths of about ⅜ inch as measured between the bottom of at least some of the recessed areas and the plane of the front face of the deformable material have been authentically reproduced.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in the light of the foregoing disclosure.

What we claim is:

1. A process for texturing a deformable material comprising:
   providing a deformable material;
   providing a mold carrying a negative impression of a pattern desired to be imparted to said deformable material, said pattern including recessed areas;
   filling said recessed areas with a liquid which is capable of being absorbed by said deformable material to a depth sufficient to displace most of the air from said recessed areas, thereby reducing the tendency for air to become trapped at the interface between said mold and said deformable material when said material is placed in contact with said mould and to form air pockets during said process;
   placing said deformable material in contact with said mold, the surface of said deformable material which contacts said mold defining a front surface and the opposite surface of said deformable material defining a rear surface;

impacting the rear surface of said deformable material while on the mold with a plurality of rapidly moving elongated members to conform the front surface of said deformable material to the mold pattern while loosely supporting said elongated members in perforations of a perforated plate and permitting limited longitudinal movement of said members in said perforations in response to said impacting; and removing said deformable material from said mold.

2. A process as claimed in claim 1 wherein said deformable material comprises a binder and fiber composition.

3. A process according to claim 1 wherein said deformable material while in contact with said mold is preheated prior to said impacting to evaporate some of said liquid.

4. A process according to claim 1 wherein said pattern includes a sharp, deep design and wherein said texturing imparted to said deformable material includes areas wherein the distance between the bottom of at least some of said recessed areas and the plane of the front face of said deformable material is about 3/8 inch.

5. A process according to claim 1 wherein said mold is pre-treated with a release agent prior to filling said recessed areas with said liquid.

6. A process according to claim 5 wherein said release agent is a mixture of kerosene and raw linseed oil.

7. A process as claimed in claim 5 wherein said mold is coated with said release agent in an amount not exceeding about 10 grams per square foot.

8. A process as claimed in claim 1 wherein at least some of the rapidly moving members which initially impact against a general portion of said deformable material have sharp pointed ends and wherein at least some of the remaining impacting members have blunted ends.

9. A process as claimed in claim 8 wherein said rapidly moving members are reciprocated at a high frequency.

10. A process as claimed in claim 1 wherein said deformable material is in an uncured state and including the step of heating said deformable material while in contact with said mold subsequent to impacting said deformable material with said rapidly moving members to preset said deformable material to prepare the same for removal from said mold.

11. A process as claimed in claim 10 wherein the step of heating includes passing said deformable material under heat lamps.

12. A process as claimed in claim 10 wherein said deformable material is heated to a temperature of between about 120° F. to about 140° F., as measured at the rear face of said deformable material.

13. A process as claimed in claim 10 wherein said deformable material is a sheet of asbestos-cement composition in an uncured state and comprising the step of curing said asbestos-cement sheet after removal of said sheet from said mold.

14. A process as claimed in claim 1 including moving said mold beneath said plate and wherein said rapidly moving members are arranged in a series of rows in said plate which said rows extend transverse to the direction of relative longitudinal motion of said mold and said deformable material and wherein at least the rapidly moving members in the first row which impact against said deformable material during vibration impact have sharp pointed ends, and the remaining rapidly moving members have blunt ends.

15. A process as claimed in claim 14 wherein said rapidly moving members are nails.

16. A process as claimed in claim 15 wherein said said deformable material is an asbestos-mement composition in an uncured state and in the form of a sheet.

17. A process as claimed in claim 15 wherein said nails are supported in a box with said plate forming the bottom thereof and wherein said box is connected to reciprocating means which impacts said nails against said rear surface of said deformable material.

18. A process as claimed in claim 17 including placing a covering material on said rear face of said deformable material prior to impacting said rear face with said nails and thereafter removing said covering material from said rear face.

19. A process as claimed in claim 18 wherein said covering material is a damp burlap fabric.

20. A process as claimed in claim 1 wherein said liquid is water.

21. A process as claimed in claim 20 wherein said water is sprayed onto said mold to fill said recessed area at least partially.

22. A process as claimed in claim 20 wherein said deformable material comprises a hydraulic setting calcareous cement and fiber composition.

23. A process as claimed in claim 22 wherein said hydraulic setting calcareous cement and fiber composition comprises an asbestos-cement composition.

24. A process as claimed in claim 23 wherein said asbestos-cement composition is in an uncured state and comprising the step of curing said asbestos-cement composition after removal of said asbestos-cement composition from said mold.

25. A process as claimed in claim 24 wherein said asbestos-cement composition is in sheet form and said sheet is placed on and supported by said mold to contact said mold.

26. A process as claimed in claim 25 wherein said asbestos-cement sheet after being cured is supported and subjected to an abrasive action to remove extraneous material from the textured surface thereof.

27. A process as claimed in claim 25 wherein said step of curing said asbestos-cement composition includes air curring.

28. A process as claimed in claim 27 including steam curing said asbestos-cement composition subsequent to said air curing.

29. A process for texturing an asbestos-cement sheet in an uncured state comprising,
providing an asbestos-cement sheet in an uncured state;
providing a mold carrying a negative impression of a pattern desired to be imparted to said deformable material, said pattern including recessed areas;
filling said recessed areas with water to a depth sufficient to displace air from said recessed areas, thereby reducing the tendency for air to become trapped at the interface between said mold and said deformable material when said material is placed in contact with said mold and to cause buckling of said deformable material during said process;
placing said asbestos-cement sheet on said mold;
impacting the rear surface of said sheet while on the mold with rapidly moving nails arranged in a series of rows extending transverse to the direction of relative longitudinal movement of said mold and said sheet, at least some of said nails in the first row which impacts against the rear surface of said sheet being provided with sharp pointed ends, the remainder of said nails being provided with blunt ends, whereby the front surface of said sheet is molded to conform to the mold pattern, while loosely supporting said nails in perforations of a perforated plate and permitting limited longitudinal movement of said nails in said perforations in response to said impacting;
heating said sheet while on said mold subsequent to said impacting to preset said sheet;
removing said sheet from said mold; and curing said sheet after removal from said mold.

30. A process as claimed in claim 29 including filling said recessed areas to about 2/3 of their depth.

(References on following page)

References Cited

UNITED STATES PATENTS

| | | | |
|---|---|---|---|
| 2,716,070 | 8/1955 | Seipt | 264—71 X |
| 137,193 | 3/1873 | Frear | 264—71 |
| 2,804,671 | 9/1957 | Saffert | 264—71 X |
| 2,256,361 | 9/1941 | Straub | 264—71 |
| 1,453,382 | 5/1923 | D'Alessandro et al. | 264—245 |
| 3,662,045 | 5/1972 | Tierling | 264—269 |
| 2,786,254 | 3/1957 | Olson | 264—71 |
| 1,942,000 | 1/1934 | Reynolds | 264—31 X |
| 3,222,434 | 12/1965 | Stedman | 264—25 |
| 2,778,088 | 1/1957 | Sterrett | 264—162 |

ROBERT F. WHITE, Primary Examiner

W. E. HOAG, Assistant Examiner

U.S. Cl. X.R.

264—293, 333